United States Patent [19]

Oleck et al.

[11] Patent Number: 4,757,041
[45] Date of Patent: Jul. 12, 1988

[54] CATALYSTS FOR CRACKING AND DEWAXING HYDROCARBON OILS

[75] Inventors: Stephen M. Oleck, Moorestown; Robert C. Wilson, Jr, Woodbury, both of N.J.

[73] Assignee: Mobil Oil Corporation, New York, N.Y.

[21] Appl. No.: 942,969

[22] Filed: Dec. 16, 1986

Related U.S. Application Data

[63] Continuation of Ser. No. 877,707, Jun. 20, 1986, abandoned, which is a continuation of Ser. No. 745,829, Jun. 18, 1985, abandoned, which is a continuation of Ser. No. 541,764, Oct. 13, 1983, abandoned.

[51] Int. Cl.⁴ ........................ B01J 29/10; B01J 29/16
[52] U.S. Cl. ........................................ 502/65; 502/66; 502/67
[58] Field of Search ............................ 502/67, 66, 65

[56] References Cited

U.S. PATENT DOCUMENTS

| | | | |
|---|---|---|---|
| 3,640,905 | 2/1972 | Wilson, Jr. | 502/67 |
| 3,755,145 | 8/1973 | Orkin | 208/111 |
| 3,758,402 | 9/1973 | Oleck et al. | 502/67 X |
| 3,804,747 | 4/1974 | Kimberlin, Jr. et al. | 502/67 X |
| 3,894,940 | 7/1975 | Scherzer et al. | 502/67 |
| 3,923,641 | 12/1975 | Morrison | 208/111 |
| 4,419,220 | 12/1983 | LaPierre et al. | 208/111 |
| 4,486,296 | 12/1984 | Oleck et al. | 502/67 |
| 4,568,655 | 2/1986 | Oleck et al. | 502/67 |
| 4,575,416 | 3/1986 | Chester et al. | 208/111 |

FOREIGN PATENT DOCUMENTS 248492 12/1983 Japan .

Primary Examiner—Carl F. Dees
Attorney, Agent, or Firm—Alexander J. McKillop; Michael G. Gilman; Malcolm D. Keen

[57] ABSTRACT

Heavy oils are simultaneously subjected to hydrocracking and dewaxing using a catalyst comprising zeolite beta and an X or Y or other faujasite zeolite together with a hydrogenation component. The process is able to effect a bulk conversion of the oil while, at the same time, yielding a low pour point product.

19 Claims, 2 Drawing Sheets

CATALYSTS FOR CRACKING AND DEWAXING HYDROCARBON OILS

This is a continuation of copending application Ser. No. 877,707, filed on June 20, 1986 (now abandoned), which is a continuation of copending application Ser. No. 745,829, filed on June 18, 1985 (now abandoned), which is a continuation of copending application Ser. No. 541,764, filed on Oct. 13, 1983 (now abandoned).

FIELD OF THE INVENTION

This invention relates to a catalytic process and catalyst for producing low pour point distillates and heavy fuels involving the use of a mixture of two crystalline zeolites. One zeolite, zeolite beta, can be stated to have both general activity for cracking the several types of hydrocarbons found in commercial heavy gas oil and also activity for selectively dewaxing certain portions of the feed. The other zeolite, zeolite Y, has general activity for cracking the above mentioned hydrocarbons. The catalyst mixture also comprises a hydrogenation component.

THE PRIOR ART

Catalytic dewaxing of hydrocarbon oils to reduce the temperature at which separation of waxy hydrocarbons occurs is a known process. A process of that nature is described in *The Oil and Gas Journal* dated Jan. 6, 1975, at pages 69–73. See also U.S. Pat. Nos. 3,668,113 and 3,894,938 which describe dewaxing followed by hydrofinishing.

Re. Pat. No. 28,398 describes a process for catalytic dewaxing with a catalyst comprising a zeolite of the ZSM-5 type. A hydrogenation/dehydrogenation component may be present.

A process for hydrodewaxing a gas oil with a ZSM-5 type catalyst is described in U.S. Pat. No. 3,956,102.

A mordenite catalyst containing a Group IV or a Group VIII metal is used to dewax a low V.I. distillate from a waxy crude, as described in U.S. Pat. No. 4,110,056.

U.S. Pat. No. 3,755,138 describes a process for mild solvent dewaxing to remove high quality wax from a lube stock, which is then catalytically dewaxed to specification pour point.

U.S. Pat. No. 3,923,641 describes a process for hydrocracking naphthas using zeolite beta as a catalyst.

U.S. Pat. No. 3,758,402 discloses a process for hydrocracking using a catalyst mixture comprising hydrogenation components, a large pore size zeolite such as zeolite X or Y and a smaller pore size zeolite of the ZSM-5 type.

Pending U.S. application Ser. No. 379,421 filed May 18, 1982, discloses a process for simultaneously hydrocracking and dewaxing hydrocarbon oils using a catalyst comprising zeolite beta composited with a metal hydrogenation component.

Hydrocracking is a well known process and various zeolite catalysts have been employed in hydrocracking processes but although they may be effective in providing distillate yields having one or more properties consistent with the intended use of the distillate, these catalysts have, in general, suffered the disadvantage of not providing product yields having good low temperature hyfluidity characteristics, especially reduced pour point and viscosity. The catalysts used for hydrocracking comprise an acid component and a hydrogenation component. The hydrogenation component may be a noble metal such as platinum or palladium or a non-noble metal such as nickel, molybdenum or tungsten or a combination of these metals. The acidic cracking component may be an amorphous material such as an acidic clay or amorphous silica-alumina or, alternatively, a zeolite. Large pore zeolites such as zeolites X or Y have been conventionally used for this purpose because the principal components of the feedstocks (gas oils, coker bottoms, reduced crudes, recycle oils, FCC bottoms) are higher molecular weight hydrocarbons which will not enter the internal pore structure of the smaller pore zeolites and therefore will not undergo conversion. So, if waxy feedstocks such as Amal Gas Oil are hydrocracked with a large pore catalyst such as zeolite Y in combination with a hydrogenation component, the viscosity of the oil is reduced by cracking most of the 650° F.+ material into material that boils at 330° F. to 650° F. The remainder of the 650° F.+ material that is not converted contains the majority of the paraffinic components in the feedstock because the aromatics are converted preferentially to the paraffins. The unconverted 650° F.+ material therefore retains a high pour point so that the final product will also have a relatively high pour point of about 50° F. Thus, although the viscosity is reduced, the pour point would still be unacceptable. Even if the conditions are adjusted to give complete or nearly complete conversion, the higher molecular weight hydrocarbons, which are present in the feedstock, principally polycyclic aromatics, will be subjected to cracking so as to lead to further reductions in the viscosity of the product. The cracking products, however, will include a substantial proportion of straight chain components (n-paraffins) which, if they are of sufficiently high molecular weight themselves, as they often are, will constitute a waxy component in the product. The final product may therefore be proportionately more waxy than the feedstock and, consequently, may have a pour point which is equally unsatisfactory or even more so. A further disadvantage of operating under high conversion conditions is that the consumption of hydrogen is increased. Attempts to reduce the molecular weight of these straight chain paraffinic products will only serve to produce very light fractions, e.g. propane, so decreasing the desired liquid yield.

In the dewaxing process, on the other hand, a shape selective zeolite such as ZSM-5 is used as the acidic component of the catalyst and the normal and slightly branched chain paraffins which are present in the feedstock will be able to enter the internal pore structure of the zeolite so that they will undergo conversion. The major proportion—typically about 70 percent of the feedstock—boiling above 650° F. will remain unconverted because the bulky aromatic components, especially the polycyclic aromatics, are unable to enter the zeolite. The paraffinic waxy components will therefore be removed so as to lower the pour point of the product but the other components will remain so that the final product will have an unacceptably high viscosity even though the pour point may be satisfactory.

SUMMARY OF THE INVENTION

It has now been found that heavy hydrocarbon oils may be simultaneously hydrocracked and hydrodewaxed to produce a liquid product of satisfactory pour point and viscosity. This desirable result is obtained by the use of a catalyst composition comprising zeolite beta and a zeolite such as rare earth exchanged zeolite X or Y, ultra stable zeolite Y, the acid form of zeolite Y (HY), or other natural or synthetic faujasite zeolite. Preferably this is a rare earth exchanged zeolite X or Y. The catalyst preferably includes a hydrogenation component to induce hydrogenation reactions. The hydrogenation component may be a noble metal or a non-noble metal and is suitably of a conventional type, e.g., nickel, tungsten, cobalt, molybdenum or combinations of these metals in their oxide or sulfide forms.

The hydrocarbon feedstock is heated with the catalyst composition under conversion conditions which are appropriate for hydrocracking. During the conversion, the aromatics and naphthenes which are present in the feedstock undergo hydrocracking reactions such as dealkylation, ring opening and cracking, followed by hydrogenation. The long chain paraffins which are present in the feedstock, together with the paraffins produced by the hydrocracking of the aromatics are, in addition, converted to products which are less waxy than the straight chain n-paraffins, thereby effecting a simultaneous dewaxing.

The process enables heavy feedstocks such as gas oils boiling above 650° F. to be converted to distillate range products boiling below 650° F. Use of the catalyst composition of this invention results in much higher hydrocracking activity, about the same or higher dewaxing activity, about the same distillate selectivity at high (70 percent) conversion and, surprisingly, better selectivity at very high (76 percent) conversion compared to similar catalysts containing only zeolite beta.

DESCRIPTION OF PREFERRED EMBODIMENTS

Catalysts

Figure 1:
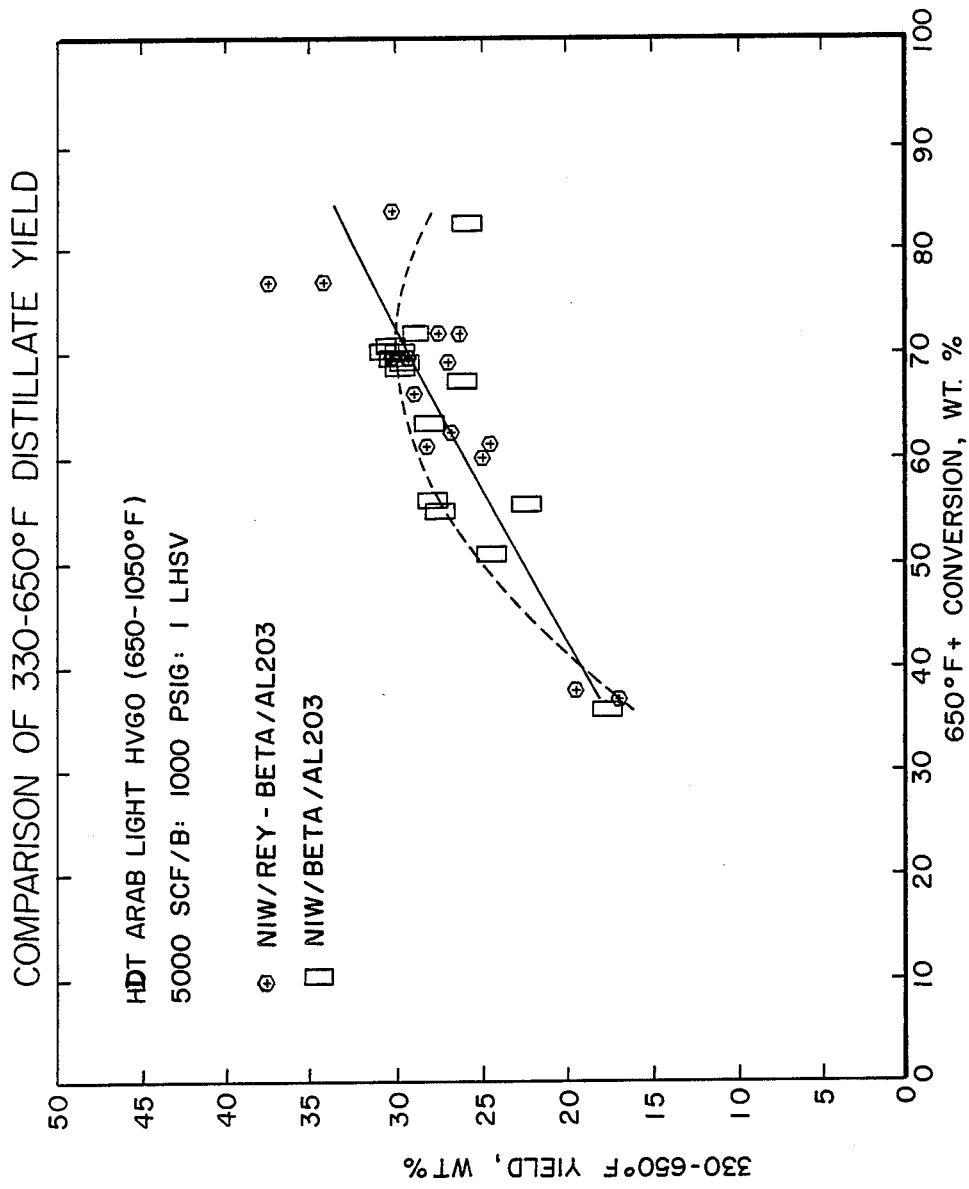

As mentioned above, the present hydrocarbon conversion process combines elements of hydrocracking and dewaxing. The catalyst used in the process comprises zeolite beta and a zeolite such as rare earth exchanged zeolite X or Y, ultra stable zeolite Y, the acid form of zeolite Y, or other natural or synthetic faujasites and a hydrogenation component which may be conventional in type. Zeolite beta, is described in U.S. Pat. Nos. 3,303,069 and Re. No. 28,341 which are incorporated herein by reference.

Zeolite beta is a crystalline aluminosilicate zeolite having a pore size greater than 5 Angstroms. The composition of the zeolite as described in U.S. Pat. Nos. 3,303,069 and Re. No. 28,341, in its as synthesized form may be expressed as follows:

where X is less than 1, preferably less than 0.7; TEA represents the tetraethylammonium ion; Y is greater than 5 but less than 100 and W is up to about 60 (it has been found that the degree of hydration may be higher than originally determined, where W was defined as being up to 4), depending on the degree of hydration and the metal cation present. The TEA component is calculated by differences from the analyzed value of sodium and the theoretical cation to structural aluminum ratio of unity.

In the fully base-exchanged form, beta has the composition:

where X, Y and W have the values listed above and n is the valence of the metal M.

In the partly base-exchanged form which is obtained from the initial sodium form of the zeolite by ion exchange without calcining, zeolite beta has the formula:

When it is used in the present catalysts, the zeolite is at least partly in the hydrogen form in order to provide the desired acidic functionality for the cracking reactions which are to take place. It is normally preferred to use the zeolite in a form which has sufficient acidic functionality to give it an alpha value of 1 or more. The alpha value, a measure of zeolite acidic functionality, is described, together with details of its measurement in U.S. Pat. No. 4,016,218 and in J. Catalysis, Vol. VI, pages 278–287 (1966) and reference is made to these for such details. The acidic functionality may be controlled by base exchange of the zeolite, especially with alkali metal cations such as sodium, by steaming or by control of the silica:alumina ratio of the zeolite.

When synthesized in the alkali metal form, zeolite beta may be converted to the hydrogen form by formation of the intermediate ammonium form as a result of ammonium ion exchange and calcination of the ammonium form to yield the hydrogen form. In addition to the hydrogen form, other forms of the zeolite wherein the original alkali metal has been reduced may be used. Thus, the original alkali metal of the zeolite may be replaced by ion exchange with other suitable metal cations including, by way of example, nickel, copper, zinc, palladium, calcium or rare earth metals.

Zeolite beta, in addition to possessing a composition as defined above, may also be characterized by its X-ray diffraction data which are set out in U.S. Pat. Nos. 3,308,069 and Re. No. 28,341. The significant d values (Angstroms, radiation: K alpha doublet of copper, Geiger counter spectrometer) are as shown in Table 1 below:

TABLE 1

| d Values of Reflections in Zeolite Beta |
| --- |
| 11.40 + 0.2 |
| 7.40 + 0.2 |
| 6.70 + 0.2 |
| 4.25 + 0.1 |
| 3.97 + 0.1 |
| 3.00 + 0.1 |
| 2.20 + 0.1 |

The preferred forms of zeolite beta for use in the present process are the high silica forms, having a silica:alumina mole ratio of at least 10:1 and preferably in the range of 20:1 to 50:1. It has been found, in fact, that zeolite beta may be prepared with silica:alumina mole ratios above the 100:1 maximum specified in U.S. Pat. Nos. 3,308,069 and Re. 28,341 and these forms of the zeolite perform well in the process. Ratios of 50:1, or even higher, e.g. 250:1, 500:1 may be used.

The silica:alumina ratios referred to in this specification are the structural or framework ratios, that is, the ratio of the $SiO_4$ to the $AlO_4$ tetrahedra which together constitute the structure of which the zeolite is composed. It should be understood that this ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by the thermogravimetric analysis (TGA) of ammonia desorption, a low ammonia titration may be obtained if cationic aluminum prevents exchange of the ammonium ions onto the acidic sites. These disparities are particularly troublesome when certain treatments such as the dealuminization method described below which result in the presence of ionic aluminum free of the zeolite structure are employed. Due care should therefore be taken to ensure that the framework silica:alumina ratio is correctly determined.

The silica:alumina ratio of the zeolite may be determined by the nature of the starting materials used in its preparation and their quantities relative one to another. Some variation in the ratio may therefore be obtained by changing the relative concentration of the silica precursor relative to the alumina precursor but definite limits in the maximum obtainable silica:alumina ratio of the zeolite may be observed. For zeolite beta this limit is usually about 100:1 (although higher ratios may be obtained) and for ratios above this value, other methods are usually necessary for preparing the desired high silica zeolite. One such method comprises dealumination by extraction with acid and this method is disclosed in detail in U.S. patent application Ser. No. 379,399, filed May 18, 1983, by R. B. LaPierre and S. S. Wong, entitled "High Silica Zeolite Beta", and reference is made to this application for additional details of the method.

Briefly, the method comprises contacting the zeolite with an acid, preferably a mineral acid such as hydrochloric acid. The dealuminization proceeds readily at ambient and mildly elevated temperatures and occurs with minimal losses in crystallinity, to form high silica forms of zeolite beta with silica:alumina ratios of at least 100:1, with ratios of 200:1 or even higher being readily attainable.

The zeolite is conveniently used in the hydrogen form for the dealuminization process although other cationic forms may also be employed, for example, the sodium form. If these other forms are used, sufficient acid should be employed to allow for the replacement by protons of the original cations in the zeolite. The amount of zeolite in the zeolite/acid mixture should generally be from 5 to 60 percent by weight.

The acid may be a mineral acid, i.e., an inorganic acid or an organic acid. Typical inorganic acids which can be employed include mineral acids such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level which could affect the crystallinity of the zeolite undergoing treatment. The acidity which the zeolite can tolerate will depend, at least in part, upon the silica/alumina ratio of the starting material. Generally, it has been found that zeolite beta can withstand concentrated acid without undue loss in crystallinity but as a general guide, the acid will be from 0.1N to 4.0N, usually 1 to 2N. These values hold good regardless of the silica:alumina ratio of the zeolite beta starting material. Stronger acids tend to effect a relatively greater degree of aluminum removal than weaker acids.

The dealuminization reaction proceeds readily at ambient temperatures but mildly elevated temperatures may be employed, e.g., up to boiling. The duration of the extraction will affect the silica:alumina ratio of the product since extraction, being diffusion controlled, is time dependent. However, because the zeolite becomes progressively more resistant to loss of crystallinity as the silica:alumina ratio increases, i.e., it becomes more stable as the aluminum is removed, higher temperatures and more concentrated acids may be used towards the end of the treatment than at the beginning without the attendant risk of losing crystallinity.

After the extraction treatment, the product is water washed free of impurities, preferably with distilled water, until the effluent wash water has a pH within the approximate range of 5 to 8.

The crystalline dealuminized products obtained by the method of this invention have substantially the same crystallographic structure as that of the starting aluminosilicate zeolite but with increased silica:alumina ratios. The formula of the dealuminized zeolite beta will therefore be

$$[(x/n)M(1\pm 0.1-X)H]AlO_2 \cdot YSiO_2 \cdot WH_2O$$

where X is less than 1, preferably less than 0.75, Y is at least 100, preferably at least 150 and W is up to 60. M is a metal, preferably a transition metal or a metal of Groups IA, 2A or 3A, or a mixture of metals. The silica:alumina ratio, Y, will generally be in the range of 100:1 to 500:1. The X-ray diffraction pattern of the dealuminized zeolite will be substantially the same as that of the original zeolite, as set out in Table 1 above.

If desired, the zeolite may be steamed prior to acid extraction so as to increase the silica:alumina ratio and render the zeolite structure more stable to the acid. The steaming may also serve to increase the ease with which the alumina is removed and to promote the retention of crystallinity during the extraction procedure. Steaming in and of itself may be sufficient to increase the desired silica alumina ratio.

The catalyst composition of this invention preferably contains a hydrogenating component which is usually derived from a metal of Groups VIA or VIIIA of the Periodic Table (the Periodic Table used in this specification is the table approved by IUPAC and the U.S. National Bureau of Standards and is known, for example, as the table of the Fisher Scientific Company, Catalog No. 5-702-10). Preferred non-noble metals are tungsten, molybdenum, nickel, cobalt, and chromium, and the preferred noble metals are platinum, palladium, iridium and rhodium. Combinations of non-noble metals selected from nickel, cobalt, molybdenum and tungsten are exceptionally useful with many feedstocks. The amount of hydrogenation component employed is not narrowly critical and can vary from about 0.01 to about 30 wt % based on the total catalyst. It is to be understood that the non-noble metal combinations may be in the oxide or sulfide form. The hydrogenation component can be exchanged into either the zeolite beta or the other (X or Y) zeolite, or both, impregnated onto them or physically admixed with them. If the metal is to be impregnated onto or exchanged into the zeolite, it may be done, for example, by treating the zeolite with a platinum metal-containing ion. Suitable platinum compounds include chloroplatinic acid, platinous chloride and various compounds containing the platinum ammine complex. The hydrogenation component can also be present in matrix material used to bind the zeolite components.

The catalyst may be treated by conventional pre-sulfiding treatments, e.g., by heating in the presence of hydrogen sulfide, to convert oxide forms of the metals such as CoO or NiO to their corresponding sulfides.

The metal compounds may be either compounds in which the metal is present in the cation of the compound or compounds in which it is present in the anion of the compound. Both types of compounds can be used. Platinum compounds in which the metal is in the form of a cation or cationic complex, e.g., $Pt(NH_3)_4Cl_2$ are particularly useful, as are anionic complexes such as the metatungstate ions. Cationic forms of other metals are also very useful since they may be exchanged onto the zeolite or impregnated into it.

Prior to use the zeolite should be dehydrated at least partially. This can be done by heating to a temperature in the range of 400° F. to 1100° F. in air or an inert atmosphere such as nitrogen for 1 to 48 hours. Dehydration can also be performed at lower temperatures merely by using a vacuum, but a longer time is required to obtain a sufficient amount of dehydration.

As stated previously another component of the catalyst mixture of this invention is a zeolite such as rare earth exchanged zeolite X or Y, ultrastable zeolite Y, or other natural or synthetic faujasite zeolites.

The X or Y zeolites or other faujasite material used in the instant invention usually have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of ammonium, hydrogen, rare earths, $Mg^{++}$, $Zn^{++}$, $Ca^{++}$, and mixtures thereof. Particularly preferred is rare earth exchanged zeolite Y.

Typical ion exchange techniques would be to contact the particular zeolite with a solution of a salt of the desired replacing cation or cations. Although a wide variety of salts can be employed, particular preference is given to chlorides, nitrates and sulfates.

As noted above, a zeolite which may be used is the ultrastable zeolite Y. The ultrastable zeolites disclosed herein are well known to those skilled in the art. For example, they are described at pages 507–522, and pages 527–528 of the book *Zeolite Molecular Sieves* by Donald W. Breck, John Wiley & Sons, Inc. 1974 and are exemplified in U.S. Pat. Nos. 3,293,192 and 3,449,070. These two patents and the Breck reference above are incorporated herein by reference. These low soda, ultra stable zeolites are available commercially from the W. R. Grace & Company.

It may be desirable to incorporate the zeolites into a material resistant to the temperature and other conditions employed in the process. Such matrix materials include synthetic and naturally occurring substances such as inorganic materials e.g. clay, silica and metal oxides. The latter may be either naturally occurring or in the form of gelatinous precipitates or gels including mixtures of silica and metal oxides. Naturally occurring clays can be composited with the zeolites including those of the montmorillonite and kaolin families. The clays can be used in the raw state as originally mined or initially subjected to calcination, acid treatment or chemical modification.

The zeolites may be composited with a porous matrix material, such as alumina, silica-alumina, silica-magnesia, silica-zirconia, silica-thoria, silica-berylia, silica-titania, as well as ternary compositions, such as silica-alumina-thoria, silica-alumina-zirconia, magnesia and silica-magnesia-zirconia. The matrix may be in the form of a cogel. The relative proportions of zeolite component and inorganic oxide gel matrix on an anhydrous basis may vary widely with the zeolite content ranging from 10 to 99, more usually 25 to 80, percent by weight of the dry composite. The matrix itself may possess catalytic properties, generally of an acidic nature and may be impregnated with the hydrogenation metal component.

The particular proportion of one zeolite component to the other in the catalyst is not narrowly critical and can vary over a wide range. However, for most purposes, the weight ratio of the X or Y type zeolite to the Beta zeolite can range from 1:10 up to 3:1, and preferably from 1:5 up to 2:1 and still more preferably from 1:4 to 1:1.

A most preferred embodiment of this invention resides in the use of a porous matrix together with the two types of zeolites previously described. Therefore, the most preferred class of catalysts falling within the scope of this invention wold include a system containing a hydrogenation component, a zeolite of the Beta type, and a zeolite of the X or Y type, which are combined, dispersed or otherwise intimately admixed with a porous matrix in such proportions that the resulting product contains 1% to 95% by weight and preferably 10 to 70% by weight of the total zeolites in the final composite.

Feedstock

The feedstock for the present conversion process comprises a heavy hydrocarbon oil such as a gas oil, coker tower bottoms fraction reduced crude, vacuum tower bottoms, deasphalted vacuum resids, FCC tower bottoms, cycle oils. Oils derived from coal, shale or tar sands may also be treated in this way. Oils of this kind generally boil above 650° F. although the process is also useful with oils which have initial boiling points as low as 500° F. These heavy oils comprise high molecular weight long chain paraffins and high molecular weight aromatics with a large proportion of fused ring aromatics. The heavy hydrocarbon oil feedstock will normally contain a substantial amount boiling above 450° F. and will normally have an initial boiling point of about 550° F., more usually about 650° F. Typical boiling ranges will be about 650° F. to 1050° F. or about 650° F. to 950° F. but oils with a narrower boiling range may, of course, be processed, for example, those with a boiling range of about 650° F. to 850° F. Heavy gas oils are often of this kind as are cycle oils and other non-residual materials. It is possible to co-process materials boiling below 500° F. but the degree of conversion will be lower for such components. Feedstocks containing lighter ends of this kind will normally have an initial boiling point above about 300° F.

The present process is of particular utility with highly paraffinic feeds because, with feeds of this kind, the greatest improvement in pour point may be obtained. However, most feeds will contain a certain content of polycyclic aromatics.

Process Conditions

The processing is carried out under conditions similar to those used for conventional hydrocracking although the use of a highly siliceous zeolite catalyst permits the total pressure requirements to be reduced. Process temperatures of 450° F. to 930° F. may conveniently be used although temperatures about 800° F. will normally not be employed as the thermodynamics of the hydrocracking reactions become unfavorable at temperatures above this point. Generally, temperatures of 570° F. to 800° F. will be employed. Total pressure is usually in the range of 100 to 3000 psig) and the higher pressures within this range over 1000 psig will normally be preferred. The process is operated in the presence of hydrogen and hydrogen partial pressures will normally be 2300 psig or less. The ratio of hydrogen to the hydrocarbon feedstock (hydrogen circulation rate) will normally be from 100 to 20,000 SCF/bbl. The space velocity of the feedstock will normally be from 0.1 to 20 LHSV, preferably 0.1 to 10 LHSV. At low conversions, the n-paraffins in the feedstock will be converted in preference to the iso-paraffins but at higher conversions under more severe conditions the iso-paraffins will also be converted. The product is low in fractions boiling below 300° F. and in most cases the product will have a boiling range of about 300° to 650° F.

The conversion may be conducted by contacting the feedstock with a fixed stationary bed of catalyst, a fixed fluidized bed or with a transport bed. A simple configuration is a trickle-bed operation in which the feed is allowed to trickle through a stationary fixed bed. With such a configuration, it is desirable to initiate the reaction with fresh catalyst at a moderate temperature which is of course raised as the catalyst ages, in order to maintain catalytic activity. The catalyst may be regenerated by contact at elevated temperature with hydrogen gas, for example, or by burning in air or other oxygen-containing gas.

A preliminary hydrotreating step to remove nitrogen and sulfur and to saturate aromatics to naphthenes without substantial boiling range conversion will usually improve catalyst performance and permit lower temperatures, higher space velocities, lower pressures or combinations of these conditions to be employed.

The improved process of this invention is illustrated by the following Examples. All parts and proportions in these Examples are by weight unless stated to the contrary.

EXAMPLE 1

Three catalysts compositions were prepared in extruded form having the following proportion of components by weight.

| Catalyst Designation | A | B | C |
|---|---|---|---|
| Na zeolite-beta | 50 | 50 | 75 |
| Rare Earth Exchanged Zeolite Y (REY)* | 0 | 15 | 0 |
| Alumina | 50 | 35 | 25 |

*Contained 14.6 wt. % RE$_2$O$_3$ and 2.2 wt. % Na

These compositions were calcined at 1000° F., and exchanged to a low sodium content with an ammonium nitrate solution and recalcined at 1000° F. The three compositions were then impregnated to a concentration of 4% nickel and 10% tungsten using nickel nitrate and ammonium metatungstate solution. Catalyst B corresponds to the catalyst composition of this invention whereas Catalyst A corresponds to the catalyst of pending application Ser. No. 379,421 filed May 18, 1982. Catalyst C corresponds to catalyst A in which the level of concentration of zeolite beta has been raised to exceed the total zeolite concentration of catalyst B.

A suitable feedstock was prepared by hydrotreating a 775°–1050° F. vacuum gas oil over a commercial nickel-molybdenum on alumina hydrotreating catalyst at a liquid hourly space velocity of 2 and a pressure 1250 psig. The hydrotreated product was then fractionated to obtain a 650° F.+ bottoms product for use as a charge stock in evaluating the catalyst compositions described previously. The catalysts were presulfided by being contacted with a 2% H$_2$S/H$_2$ mixture. Portions of the feedstock prepared as described above were then each flowed over samples of catalysts A and B in a down-flow fixed-bed unit at a liquid hourly space velocity of 1 and a pressure of 1000 psig.

Product yields at about 70% conversion of 650° F.+ compare as follows:

| Catalyst Designation | A | B |
|---|---|---|
| Conversion, Wt % | 71 | 70 |
| Yields, Wt % | | |
| C$_1$–C$_4$ | 9.6 | 9.1 |
| C$_5$–330° F. Naphtha | 31.2 | 31.9 |
| 330–650° F. Distillate | 31.2 | 29.6 |
| 650–775° F. Distillate | 16.2 | 15.1 |
| 775° F.+ | 12.8 | 14.9 |

This shows distillate selectivity is about the same for both catalysts at normal conversion levels.

FIG. 1 compares 330°–650° F. distillate yields for catalysts A and B. This shows that above 70% conversion, B catalyst (15% REY) produces more 330°–650° F. distillate than catalyst A (0% REY).

Figure 2:
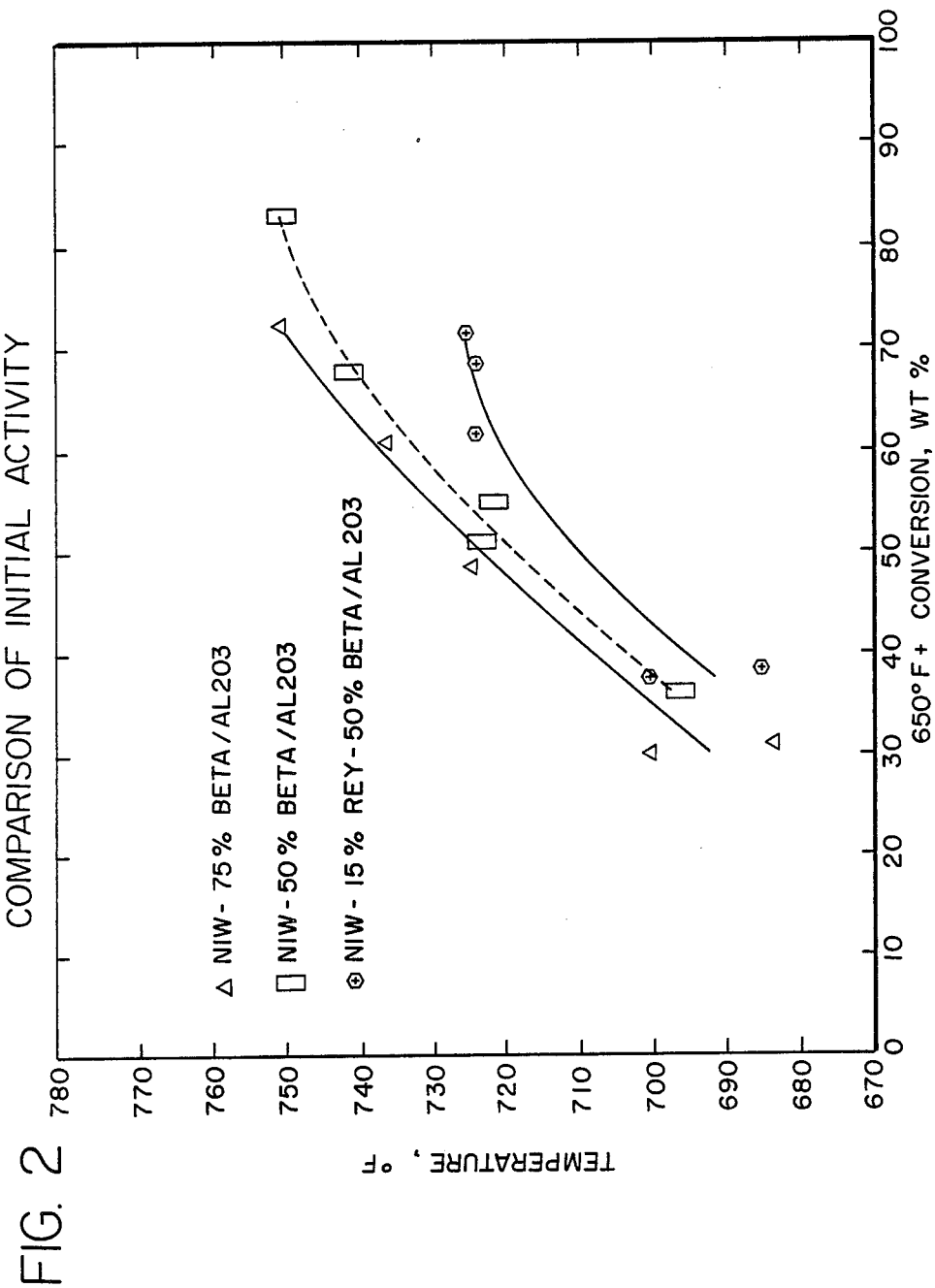

FIG. 2 compares the activity of the three catalyst samples A, B and C. It is readily apparent that the catalyst of this invention, B, is more active than catalyst A or C, particularly at corresponding temperatures. It is also readily apparent that increasing the fraction of zeolite beta as in catalyst C does not result in a corresponding increase in activity in comparison to catalyst B. It is only through the addition of the zeolite Y (rare earth exchanged) that an increase in activity is obtained.

The properties of the 330° F.+ fractions were as follows:

| Catalyst Designation | A | B |
|---|---|---|
| 330–650° F. Distillate | | |
| Pour Point, °F. | −65 | −65 |
| Sulfur, ppm | 20 | 20 |
| Nilrogen, ppm | 1 | 1 |
| Diesel Index | 45 | 43 |
| 650–775° F. Distillate | | |
| Pour Point, °F. | 10 | 0 |
| Sulfur, ppm | 20 | 20 |
| Nitrogen, ppm | 9 | 8 |
| Diesel Index | 54 | 53 |
| 775° F.+ | | |
| Pour Point, °F. | −20 | −30 |
| Sulfur, ppm | 60 | 50 |
| Nitrogen, ppm | 27 | 10 |

The above data show that the addition of 15% rare earth exchanged zeolite Y has no adverse effect on the quality of the products obtained.

The process and catalyst of this invention provide the advantages of enabling production of a hydrocarbon fraction of low sulfur, low pour point that is immediately available for blending into commercial products. The length of a process cycle is increased because lower temperatures can be used at the beginning of the cycle thus slowing the carbonization and other deterioration of the catalyst. Selectively to the production of distillate is enhanced as is the dewaxing function of the catalyst.

What is claimed is:

1. A catalyst composition for hydrodewaxing and hydrocracking a hydrocarbon fraction, said catalyst composition comprising a mixture of one or more zeolites selected from the groups consisting of zeolite X and Y, the acid form of zeolite Y, and other natural or synthetic faujasites, a hydrogenation metal, and zeolite beta.

2. The catalyst composition of claim 1 wherein the concentration of said zeolite selected from the group consisting of zeolite X and Y and other natural or synethetic faujasites in said catalyst is between about 5 and about 20 percent by weight of said total catalyst composition.

3. The catalyst composition of claim 1 wherein the concentration of zeolite beta in said catalyst is between about 20 and about 60 percent by weight of total catalyst composition.

4. The catalyst composition of claim 1 wherein the concentration of hydrogenation metal in said catalyst is between about 0.1 and about 30 percent by weight of total catalyst composition.

5. The catalyst composition of claim 1 wherein said hydrogenation metal is one or more metals selected from the group consisting of Groups VIA and VIIIA.

6. The catalyst composition of claim 1 wherein said hydrogenation metal is one or more metals selected from the group consisting of tungsten, molybdenum, nickel, cobalt, chromium, platinum, palladium, iridium and rhodium.

7. The catalyst composition of claim 1 wherein said hydrogenation metal or metals is in the form of oxides or sulfides.

8. The catalyst composition of claim 1 wherein one of said zeolites is zeolite X.

9. The catalyst composition of claim 1 wherein one of said zeolites is zeolite Y.

10. The catalyst composition of claim 1 wherein one of said zeolites is a rare earth-exchanged zeolite X.

11. The composition of claim 1 wherein one of said zeolites is rare earth-exchanged zeolite Y.

12. The composition of claim 1 wherein one of said zeolites is ultrastable zeolite Y.

13. The composition of claim 1 wherein one of said zeolites is a synthetic or natural faujasite.

14. The composition of claim 1 wherein said zeolite beta has a silica:alumina mole ratio of between about 10:1 and about 500:1.

15. The composition of claim 1 wherein said zeolite beta has a silica:alumina mole ratio of about 20:1 to about 50:1.

16. The composition of claim 1 further comprising a porous matrix material.

17. The composition of claim 16 wherein the porous matrix material is alumina.

18. The composition of claim 16 wherein the porous matrix is silica-alumina.

19. The composition of claim 1 wherein one of said zeolites is the acid form of zeolite Y.

* * * * *